UNITED STATES PATENT OFFICE.

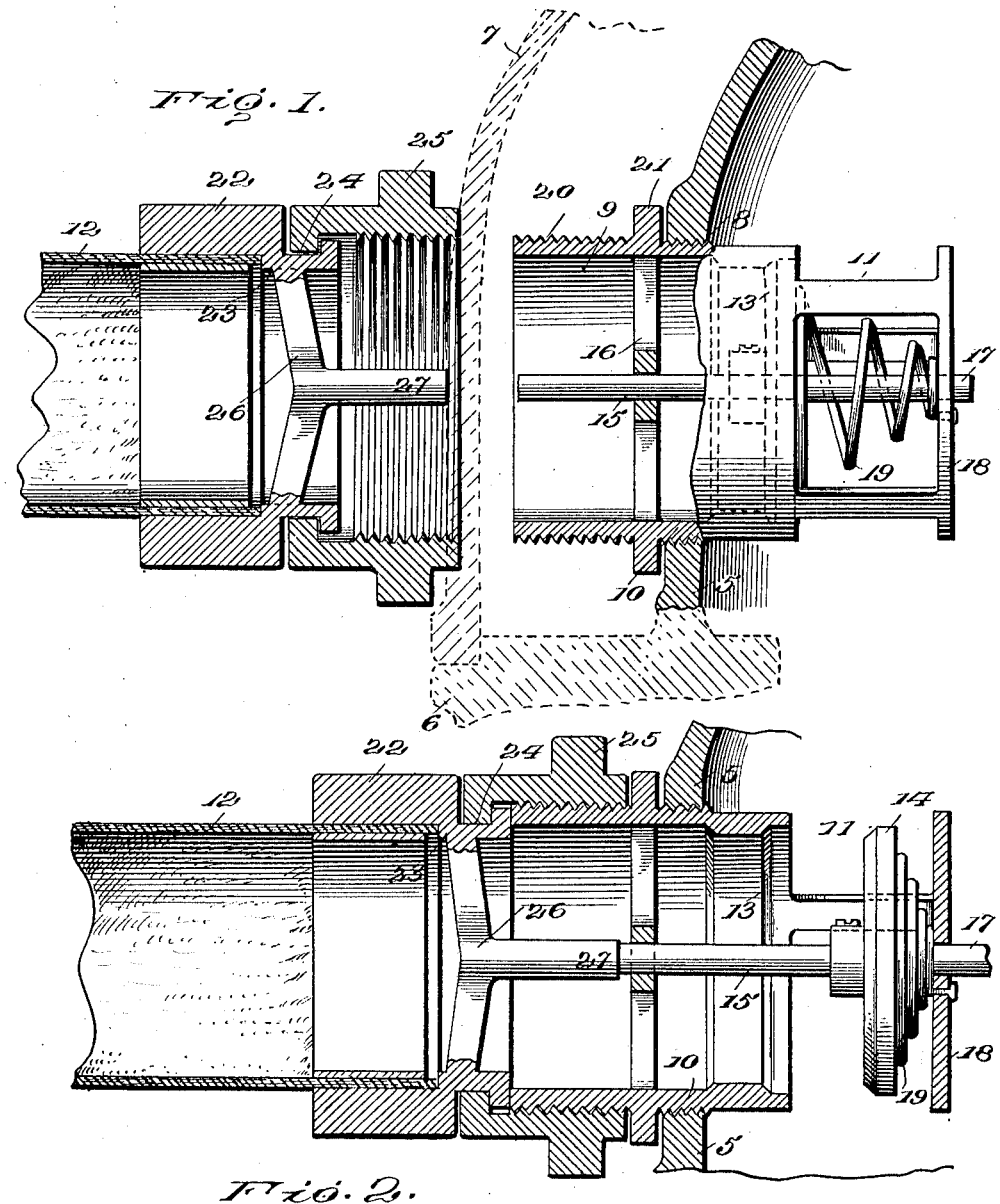

MURRAY OWEN LINSCOTT AND WILLIAM ALEXANDER McINTOSH, OF BEVERLY, MASSACHUSETTS.

HYDRANT-OUTLET.

1,020,917. Specification of Letters Patent. Patented Mar. 19, 1912.

Application filed February 28, 1911. Serial No. 611,465.

*To all whom it may concern:*

Be it known that we, MURRAY O. LINSCOTT and WILLIAM A. MCINTOSH, citizens of the United States, residing at Beverly, in the county of Essex and State of Massachusetts, have invented certain new and useful Improvements in Hydrant-Outlets, of which the following is a specification.

This invention relates to hydrant outlets, and has for its object the provision of a comparatively simple and thoroughly efficient device of this character by means of which additional lines of hose may be readily connected to the discharge nipples of a hydrant or fire-plug without cutting off the water supply or in any manner interfering with the flow of water through the lines of hose already connected to said fire-plug or hydrant.

A further object of the invention is to provide a hydrant outlet including a casing having its inner end communicating with the interior of the stand pipe and its outer end threaded for connection with a hose, there being a spring actuated valve arranged within the casing and movable to open position by an impact rod on the coupling member of a hose, when the latter is connected with the threaded end of said casing.

A still further object of the invention is generally to improve this class of devices, so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawing, in which:

Figure 1 is a vertical section, partly in elevation, of a hydrant outlet constructed in accordance with our invention, showing the valve closed and a hose in position to engage the threaded end of the casing, the body of the hydrant or fire-plug and cover being indicated in dotted lines; and Fig. 2 is a longitudinal sectional view showing the hose connected with the threaded end of the casing and the valve in open position to permit the flow of water from the standpipe to said hose.

Corresponding and like parts are referred to in the following description and indicated in all the views of the accompanying drawings by the same reference characters.

The improved coupling forming the subject matter of the present invention is shown, by way of illustration, in connection with a fire-plug of the ordinary construction, in which 5 designates the stand pipe, 6 the casing, and 7 the lid or cover forming a closure for the upper end of said casing. The stand pipe 5 is provided with a plurality of outlets 8 in which are seated valve casings 9 for connection with a fire engine hose, and as these valve casings are similar in construction, a detailed description of one will suffice for all.

The valve casing 9 is preferably cylindrical in shape and provided with exterior threads 10 for engagement with corresponding threads formed in the walls of the outlet openings 8. The inner end of the casing 9 extends within the standpipe 5 and is provided with a plurality of discharge ports 11 through which the water from the standpipe flows to the hose, indicated at 12. Formed on the interior wall of the valve casing 9 is a circumferential shoulder 13 constituting a seat for a longitudinally movable valve 14. The valve 14 is provided with a stem 15 which latter projects through an opening formed in a transverse brace 16, with its outer end disposed entirely within the lines of the casing 9, so as not to offer any obstruction at the mouth of said casing.

Secured to or formed integral with the rear face of the valve 14 is a pin 17 which projects through the rear wall 18 of the valve casing and serves to center the valve as the latter is moved to open and closed positions. Interposed between the valve 14 and the rear wall 18 of the casing is a coil spring 19 which normally and yieldably holds the valve in closed position. The outer end of the casing 9 is exteriorly threaded at 20 and is provided with an annular shoulder 21, by means of which the casing may be conveniently gripped with a wrench or other suitable tool so as to facilitate threading the casing on the standpipe.

The hose 12 is provided with a clamping collar 22 having its outer end formed with a circumferential groove 23 adapted to receive the flanged end 24 of a union nut or coupling 25, the latter being provided with interior threads for engagement with the exterior threads of the casing 9, as shown.

Extending transversely across the clamping collar 22 is a bar 26 having an impact rod 27 extending longitudinally from the center thereof and adapted to engage the valve stem, and open the valve so as to permit the flow of water from the standpipe through the hose when the latter is connected with the casing 9. Thus it will be seen that when the union nut or collar 25 of one line of hose is threaded on the outer end of the casing 9, the free end of the impact rod 27 will bear against the adjacent end of the valve stem 15 and force the valve 14 rearwardly against the tension of the spring 19, thus permitting the water in the standpipe to flow through the ports 11 to the hose without cutting off the water supply, or in any manner interfering with the flow of water to the lines of hose already connected with said standpipe.

Attention is called to the fact that the outer ends of the casings 9 are entirely housed within the cover 7 when the latter is in closed position, so as not to offer any surface projection on the exterior of the fire-plug.

While the device is principally designed for connecting fire engine hose to hydrants, fire-plugs, and the like, it will of course be understood that the same may be used with equally good results for connecting adjacent sections of hose, or wherever a device of this character is found desirable or necessary. It will also be noted that the threads 20 are coarse and the threads 10 relatively thin, while one end of the coil spring 19 is seated in an opening in the rear wall 18 of the valve casing, so as to center the spring with respect to the pin 17.

Having thus described the invention, what is claimed as new is:

1. The combination with a valve casing having its rear end provided with outlet ports, a transverse bar arranged within the casing and provided with an opening, there being an opening formed in the rear end of the casing and arranged in alinement with the first mentioned opening, a valve having a stem on one end thereof slidably mounted in the opening in the transverse bar and provided at its other end with a rod extending into the opening in the rear end of the casing, a spring disposed between the rear end of the casing and the valve for normally holding the latter in closed position, and a hose coupling having an impact rod secured thereto and adapted to engage the adjacent end of the valve stem for opening the valve when the coupling is connected with said casing.

2. The combination with a fire-plug including a casing having a cover, of a standpipe arranged within the casing, a valve casing threaded in an opening in the standpipe and having its inner end provided with outlet ports and its outer end exteriorly threaded, a transverse bar disposed within the casing near the outer end thereof and provided with an opening, there being an opening formed in the rear wall of the valve casing, a valve arranged within the casing and having one end thereof provided with a stem extending through the opening in the bar and its other end provided with a rod seated in the opening in the rear end of the casing, there being an annular shoulder formed within the casing and constituting a valve seat, and a spring interposed between the rear end of the casing and valve for normally holding the latter in closed position, the outer end of the valve casing being housed within the cover when said cover is closed.

In testimony whereof, we affix our signatures in presence of two witnesses.

MURRAY OWEN LINSCOTT. [L. S.]
WILLIAM ALEXANDER McINTOSH. [L. S.]

Witnesses:
Jos. F. Randolph,
Georgianna M. Stone.

---

Copies of this patent may be obtained for five cents each, by addressing the "Commissioner of Patents, Washington, D. C."